(12) United States Patent
Henkel

(10) Patent No.: US 10,072,393 B2
(45) Date of Patent: Sep. 11, 2018

(54) SLIDING BEAM FOR SUPPORTING A WORK MACHINE

(71) Applicant: LIEBHERR-WERK EHINGEN GMBH, Ehingen/Donau (DE)

(72) Inventor: Joachim Henkel, Holzguenz (DE)

(73) Assignee: Liebherr-Werk Ehingen GmbH, Ehingen/Donau (DE)

( * ) Notice: Subject to any disclaimer, the term of this patent is extended or adjusted under 35 U.S.C. 154(b) by 0 days.

(21) Appl. No.: 15/551,231

(22) PCT Filed: Mar. 17, 2016

(86) PCT No.: PCT/EP2016/000484
§ 371 (c)(1),
(2) Date: Aug. 15, 2017

(87) PCT Pub. No.: WO2016/146267
PCT Pub. Date: Sep. 22, 2016

(65) Prior Publication Data
US 2018/0030689 A1    Feb. 1, 2018

(30) Foreign Application Priority Data

Mar. 19, 2015 (DE) .................. 10 2015 003 634

(51) Int. Cl.
*E02F 9/08* (2006.01)
*B60S 9/02* (2006.01)
*B66C 23/78* (2006.01)

(52) U.S. Cl.
CPC ............ *E02F 9/085* (2013.01); *B60S 9/02* (2013.01); *B66C 23/78* (2013.01)

(58) Field of Classification Search
CPC .. E02F 9/085; B66C 23/78; B60S 9/04; B60S 9/02; B60S 9/10; B60S 9/12
See application file for complete search history.

(56) References Cited

U.S. PATENT DOCUMENTS 2,194,594 A * 3/1940 Halley ............... B60S 9/12
254/423
2,790,657 A * 4/1957 Wilder ............... A45B 9/00
248/354.1

(Continued)

FOREIGN PATENT DOCUMENTS

AT           359379 B      11/1980
CN        201580365 U       9/2010
(Continued)

OTHER PUBLICATIONS

ISA European Patent Office, International Search Report Issued in Application No. PCT/EP2016/000484, dated Jun. 16, 2016, WIPO, 6 pages.

*Primary Examiner* — Jacob B Meyer
(74) *Attorney, Agent, or Firm* — McCoy Russell LLP

(57) ABSTRACT

The present invention relates to a telescopic sliding beam for supporting a work machine comprising a sliding beam box and an internal sliding beam that is outwardly telescopically supported in the sliding beam box. The sliding beam box and the internal sliding beam have an opening in the peripheral region, with the openings overlapping one another in an outwardly telescoped state, and with a bolt being able to be introduced into the overlapping openings. The sliding beam box has an abutment at its inner side and the internal sliding beam has an abutment at its outer side, with the abutment of the sliding beam box and the abutment of the internal sliding beam contacting one another in an outwardly telescoped state such that a further pulling of the internal sliding beam out of the sliding beam box is suppressed. The invention furthermore comprises a work machine comprising this telescopic sliding beam.

16 Claims, 3 Drawing Sheets

(56) References Cited

U.S. PATENT DOCUMENTS

| | | | | |
|---|---|---|---|---|
| 2,909,253 A * | 10/1959 | Hinze | ............... | E04G 11/56 403/106 |
| 3,007,717 A * | 11/1961 | Noly | ............... | B60S 9/04 280/765.1 |
| 3,784,035 A * | 1/1974 | Dunbar | ............... | B60P 1/5433 212/302 |
| 3,981,514 A * | 9/1976 | Visser | ............... | B66C 23/80 280/765.1 |
| 4,084,777 A * | 4/1978 | Lambert | ............... | B66C 23/80 212/304 |
| 4,131,295 A * | 12/1978 | Highberger | ............... | B60D 1/26 280/475 |
| 4,240,334 A * | 12/1980 | Crosser | ............... | F15B 15/261 92/114 |
| 4,299,421 A * | 11/1981 | Bontrager | ............... | B60S 9/04 296/171 |
| 4,307,896 A * | 12/1981 | Walther | ............... | B60S 9/04 254/419 |
| 4,394,912 A * | 7/1983 | Epps | ............... | B66C 23/78 212/303 |
| 4,449,734 A * | 5/1984 | Cory | ............... | B66C 23/80 212/303 |
| 4,485,996 A * | 12/1984 | Beukema | ............... | A47C 3/30 248/407 |
| 4,593,932 A * | 6/1986 | Miyazawa | ............... | E02F 9/085 212/304 |
| 4,770,304 A * | 9/1988 | Woods | ............... | B66C 23/48 212/195 |
| 5,067,739 A * | 11/1991 | Kuan | ............... | B62H 1/06 180/219 |
| 5,121,816 A * | 6/1992 | Curtin | ............... | B66B 9/04 187/243 |
| 5,622,446 A * | 4/1997 | Hibberd | ............... | F16B 7/1427 403/109.8 |
| 6,623,035 B1 * | 9/2003 | Schneider | ............... | B60S 9/04 248/161 |
| 6,676,326 B2 * | 1/2004 | Wu | ............... | F16B 7/042 403/109.3 |
| 7,398,959 B2 * | 7/2008 | VanDenberg | ............... | B60S 9/08 254/2 R |
| 7,575,249 B2 * | 8/2009 | Riedl | ............... | B60S 9/08 254/419 |
| 7,594,679 B1 * | 9/2009 | Schneider | ............... | B66C 23/80 280/763.1 |
| 9,073,517 B2 * | 7/2015 | Schurmann et al. | ... | B66C 23/80 |
| 9,199,828 B2 * | 12/2015 | Steinich | ............... | B66C 23/78 |
| 9,446,743 B2 * | 9/2016 | Madison | ............... | B60S 9/22 |
| 9,464,404 B2 * | 10/2016 | Patte | ............... | E02F 9/085 |
| 9,566,955 B2 * | 2/2017 | Seidel | ............... | B60D 1/155 |
| 9,701,286 B2 * | 7/2017 | Dickerson | ............... | B60S 9/08 |
| 2006/0043718 A1 * | 3/2006 | Mayer | ............... | B66C 23/80 280/763.1 |
| 2007/0084813 A1 * | 4/2007 | Morath | ............... | B66C 23/78 212/175 |
| 2007/0210292 A1 * | 9/2007 | Zou | ............... | B60S 9/12 254/423 |
| 2009/0139947 A1 * | 6/2009 | Harris | ............... | B66C 23/80 212/278 |
| 2011/0062695 A1 * | 3/2011 | Bergemann | ............... | B66C 23/80 280/763.1 |
| 2016/0185322 A1 * | 6/2016 | Vierkotten | ............... | B66C 23/80 701/50 |

FOREIGN PATENT DOCUMENTS

| | | |
|---|---|---|
| CN | 103612621 A | 3/2014 |
| DE | 2460626 A1 | 6/1975 |
| DE | 2702850 A1 | 7/1977 |
| DE | 3143802 A1 | 6/1982 |
| DE | 102010056584 A1 | 7/2012 |
| GB | 1489368 A | 10/1977 |
| JP | H10265177 A | 10/1998 |
| JP | H11301428 A | 11/1999 |
| WO | 2013037205 A1 | 3/2013 |

* cited by examiner

SLIDING BEAM FOR SUPPORTING A WORK MACHINE

CROSS-REFERENCE TO RELATED APPLICATION

The present application is a U.S. National Phase of International Patent Application Serial No. PCT/EP2016/000484, entitled "SLIDING BAR FOR SUPPORTING A WORKING MACHINE," filed on Mar. 17, 2016. International Patent Application Ser. No. PCT/EP2016/000484 claims priority to German Patent Application No. 10 2015 003 634.3, filed on Mar. 19, 2015. The entire contents of each of the abovementioned applications are hereby incorporated by reference in their entirety for all purposes.

TECHNICAL FIELD

The invention relates to a telescopic sliding beam for supporting a work machine such as is used in mobile cranes or excavators.

BACKGROUND AND SUMMARY

A plurality of work machines require a hydraulic support possibility to improve the bearing capacity and the stability of the work machine. Telescopic sliding beams that are connected to the work machine are typically used for this purpose.

Different extension states of the sliding beams projecting laterally from the chassis are required for a secure working operation in dependence on the local circumstances and on the required supporting force. In a maximally extended position of the sliding beam, a certain overlap of the sliding beam box and the internal sliding beam supported therein is nevertheless required to be able to lead off the forces that occur. A substantially vertical element that can be brought into direct connection with the ground is typically located at the telescopic end remote from the work machine. The introduction of forces into the ground takes place via this supporting foot (=vertical element). However, a vertical load is simultaneously produced in this respect that generates a bending moment in the region of the overlap of the sliding beam box and the internal sliding beam. It must be ensured for this reason that a sufficiently large overlap of the sliding beam box and the internal sliding beam is present to lead off the bending moment. Due to these considerations, a certain section of the internal sliding beam always remains in the sliding beam box surrounding the internal sliding beam.

It is the aim of the invention to further develop a telescopic sliding beam of the category such that the overlap region of the internal sliding beam and the sliding beam box can be reduced in order thus to achieve a larger extension length of a telescopic sliding beam and/or to reduce the weight of a sliding beam.

This object is achieved by a telescopic sliding beam for supporting a work machine comprising a sliding beam box and an internal sliding beam that is telescopically supported in the sliding beam box. The sliding beam in accordance with the invention is furthermore characterized in that the sliding beam box and the internal sliding beam each have an opening in the peripheral region, said openings overlapping one another in an outwardly telescoped state of the telescopic sliding beam, with a bolt being able to be introduced into the mutually overlapping openings. The sliding beam box furthermore has a respective abutment at its inner side and the internal sliding beam has a respective abutment at its outer side, with the abutment of the sliding beam box and the abutment of the internal sliding beam being able to be brought into engagement with one another, preferably contact one another, in an outwardly telescoped state such that a further pulling of the internal sliding beam out of the sliding beam box is suppressed.

The internal sliding beam is therefore supported in the sliding beam box in an inwardly and outwardly pushable manner. It is of advantage in this respect if both the sliding beam box and the internal sliding beam have a similar cross-sectional shape, preferably rectangular or circular. Both the sliding beam box and the internal sliding beam each have an opening in the peripheral region, by which no opening is meant in the end faces of the sliding beam box and of the internal sliding beam. Only the surface region in parallel with the longitudinal direction of the respective component is therefore meant by peripheral region.

In an outwardly telescoped state, that does not necessary describe the maximum drawn out state of the internal sliding beam from the sliding beam box, the two openings arranged in the peripheral region overlap such that a connection is created from the opening of the sliding beam box through the opening of the internal sliding beam to the inner side of the internal sliding beam. It is thereby possible, for example, to introduce a bolt from the outside through the opening of the sliding beam box and through the opening of the internal sliding beam.

The sliding beam box furthermore has an abutment at its inner side and the internal sliding beam has an abutment at its outer side. The abutment of the internal sliding beam preferably extends perpendicular to the longitudinal direction of the internal sliding beam, wherein the abutment of the sliding beam box extends in a corresponding manner such that the two abutments contact one another or are adjacent to one another in an outwardly telescoped state. In this respect, the abutment of the internal sliding beam can represent a flange-like collar that only extends along a part region in the peripheral direction. The abutment of the sliding beam box can likewise represent a flange-like collar that projects from its inner side. The two abutments can thus be aligned with respect to one another such that they abut one another on a drawing out of the internal sliding beam to prevent any further drawing out of the internal sliding beam.

Using a telescopic sliding beam that has the features of claim 1, it is possible to remove the vertical bending moments that occur in the overlap region of the sliding beam box and the internal sliding beam by a horizontal force couple. The vertical element that is arranged at the extensible end of the internal sliding beam undergoes a vertical force exertion on a support procedure and said vertical force exertion is reflected in a corresponding manner on the overlap region. In an outwardly telescoped state of the sliding beam, the vertical counter-force that occurs in the overlap region of the sliding beam box and the internal sliding beam can be removed by a horizontal force couple by introducing a bolt into the mutually overlapping openings.

The openings preferably overlap one another when the respective abutments of the sliding beam box and of the internal sliding beam contact one another or are adjacent to one another. A vertical counter-force that acts on the overlap region can then be removed by a horizontal force couple by introducing a bolt into the two openings. Further preferably, the respective openings are disposed opposite the associated abutments, that is, they are arranged at oppositely disposed points of the sliding beam box or of the internal sliding beam.

The overlapping length of the internal sliding beam in the sliding beam box can be reduced to a minimum by a sliding beam in accordance with the invention. A weight reduction can thereby be achieved or the support width of the work machine can be increased by an achievable larger extension length of the internal sliding beam.

It is of advantage for the present invention if the openings of the sliding beam box and of the internal sliding beam present in the overlap region overlap one another and the abutment of the sliding beam box and the abutment of the internal sliding beam simultaneously contact one another and/or are adjacent to one another. It is thereby possible to convert the vertical counter-force acting on the overlap region particularly effectively into a horizontal force couple that occurs in the region of the openings arranged in the peripheral direction and of an engaged abutment pair.

In accordance with a further optional feature of the invention, the opening of the sliding beam box and the opening of the internal sliding beam are located in the top chord of the corresponding component. The abutment of the sliding beam box and the abutment of the internal sliding beam are preferably arranged in the respective bottom chord. In this respect, with a telescopic sliding beam aligned in accordance with its purpose, the term top chord describes the side remote from the ground and the term bottom chord describes the side of the substantially horizontally aligned sliding beam box or internal sliding beam facing the ground.

In accordance with a further advantageous modification of the present invention, the abutment of the sliding beam box is formed in one piece with the sliding beam box and/or the abutment of the internal sliding beam is formed in one piece with the internal sliding beam. It is thereby ensured that the sliding beam box and the internal sliding beam can particularly effectively lead off and/or release the forces acting on the respective abutment.

The openings of the sliding beam box and the opening of the internal sliding beam are preferably of identical form. In this respect, each of the openings can have a circular and/or rectangular shape. Identically extending abutment surfaces that can act against the bolt result due to the identical formation of the two openings on an introduction of a bolt both in the opening of a sliding beam box and in the opening of the internal sliding beam.

The opening of the sliding beam box and the opening of the internal sliding beam are preferably arranged directly above one another in an outwardly telescoped state of the sliding beam. In this respect, the two openings can be aligned flush with one another such that, on an introduction of a bolt, a displacement of the sliding beam box toward the internal sliding beam is no longer possible in any direction.

It is furthermore of advantage if the material thickness of the internal sliding beam and of the sliding beam box is thicker at their respective openings or in the region of their respective openings than in other regions. It is also sensible to make a marginal region of the opening of the sliding beam box and/or of the internal sliding beam of a different thickness in contrast with another marginal region of the same opening. The force to be led off is typically applied in a limited marginal region of the opening on a use as intended, typically in the region that is thicker. The acting force is thereby distributed over a larger effective surface overall and fewer wear-induced defects arise.

A further optional feature of the present invention is that the sliding beam box has an outwardly projecting elevated portion that is perpendicular to the telescoping direction of the sliding beam and that is configured as aligned with its opening in a marginal region of its opening. The perpendicular elevated portion serves as an enlargement of the abutment surface of a bolt that can be introduced into the opening. In this respect, the perpendicular elevated portion extends in alignment with the opening. An inclination of the bolt can thus be effectively suppressed with a bolt introduced into the opening. Alternatively, the perpendicular elevated portion can also project inwardly in the marginal region of its opening. In this case, the bolt is not pushed in from the outside, but rather from the inside. This embodiment variant can have advantages for space reasons.

The perpendicular elevated portion is preferably configured in one piece with the sliding beam box and can also surround the entire marginal region of its opening.

A gap can furthermore be provided between the outer side of the internal sliding beam and the inner side of the sliding beam box. On a cylindrical implementation of the sliding beam box and of the internal sliding beam, the gap can be produced due to a difference in the outer diameter of the internal sliding beam from the internal diameter of the sliding beam box.

The gap is preferably larger than or the equal to the height of the abutment at the outer side of the internal sliding beam. It is meant by this that the gap between the sliding beam box and the internal sliding beam is equal to or larger than the abutment of the internal sliding beam projecting perpendicular to the telescoping direction. A dismantling of the internal sliding beam from the sliding beam box can take place in a simple manner by providing this gap. In this respect, it is then only necessary to bring the two mutually contacting abutments out of engagement by a raising or a rotating about the longitudinal direction of the internal sliding beam such that a complete pulling of the internal sliding beam out of the sliding beam box can take place. An assembly or a dismantling can thus be carried out particularly fast and in a particularly uncomplicated manner. Access to the inner sides of the sliding beam box and/or of the internal sliding beam is also particularly simple on a necessary repair or service. In addition, the introduction of a section into the telescopic sliding beam is possible without a lot of effort.

In accordance with a further advantageous variant of the invention, an insertion block is pushed into a gap between the inner side of the sliding beam box and the outer side of the internal sliding beam in an outwardly telescoped state of the sliding beam. The gap is preferably located between the two top chords of the sliding beam box and the internal sliding beam. When a gap is present, the force acting vertically on the overlap region is removed by the insertion block without a kink in the telescopic sliding beam occurring.

It is not relevant for the basic idea of the invention whether the article called a sliding beam box is only a further beam element of a telescopic arrangement, that is, is likewise arranged receivable in a sliding beam box or not. The invention is not restricted to a sliding beam that only has two sections (=beam elements). The invention can rather also be used with a sliding beam having more than two sections. A beam element is therefore called a sliding beam box that can receive an internal sliding beam, independently of whether a further beam element can be received in the internal sliding beam or whether the sliding beam box itself can be received in a further beam element.

The present invention furthermore comprises a work machine, in particular a mobile crane or an excavator, having a telescopic sliding beam that has one of the above-listed feature combinations.

Further features, details and advantages of the invention result from the embodiments shown in the drawings.

DETAILED DESCRIPTION

Figure 1:
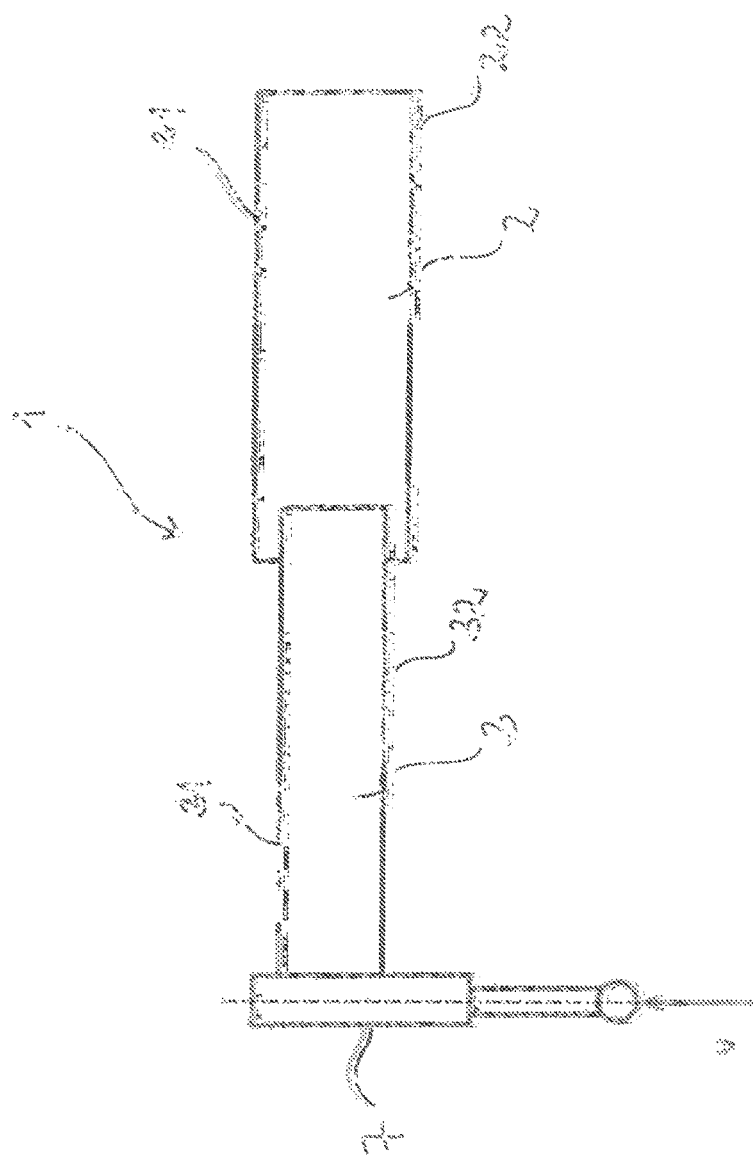
FIG. 1. shows a schematic diagram of a telescopic sliding beam.

FIG. 1 shows a telescopic sliding beam 1 having a sliding beam box 2 and an internal sliding beam 3 partly pulled out of it. A vertical element 7 (=support foot) that is configured to come into contact with a floor surface is arranged at the tip of the internal sliding beam 3 remote from the sliding beam box 2. The sliding beam box is typically connected to a work machine.

The sliding beam box 2 has a top chord 21 and a bottom chord 22. The internal sliding beam 3 also has a top chord 31 and a bottom chord 32. In this respect, the definition of a top chord and of a bottom chord is made using the alignment as intended of the telescopic sliding beam 1. The side facing the floor is in this respect called the bottom chord and the side remote from the floor the top chord.

In a supporting procedure of the sliding boom, a force V acts on the vertically extending element 7 (support foot) and is directed from the floor onto the vertically extending element 7. This force effects a vertical counter-force that acts from above in the overlap region of the two top chords 21, 31 of the sliding beam box 2 and of the internal sliding beam 3. If this force becomes too large, the sliding beam 1 kinks at the overlap region. The overlap region has to be sufficiently stable for this reason. In the prior art, this is achieved by a sufficiently large overlap, that is, an incomplete pulling of the internal sliding beam 3 out of the sliding beam box 2.

Figure 2:
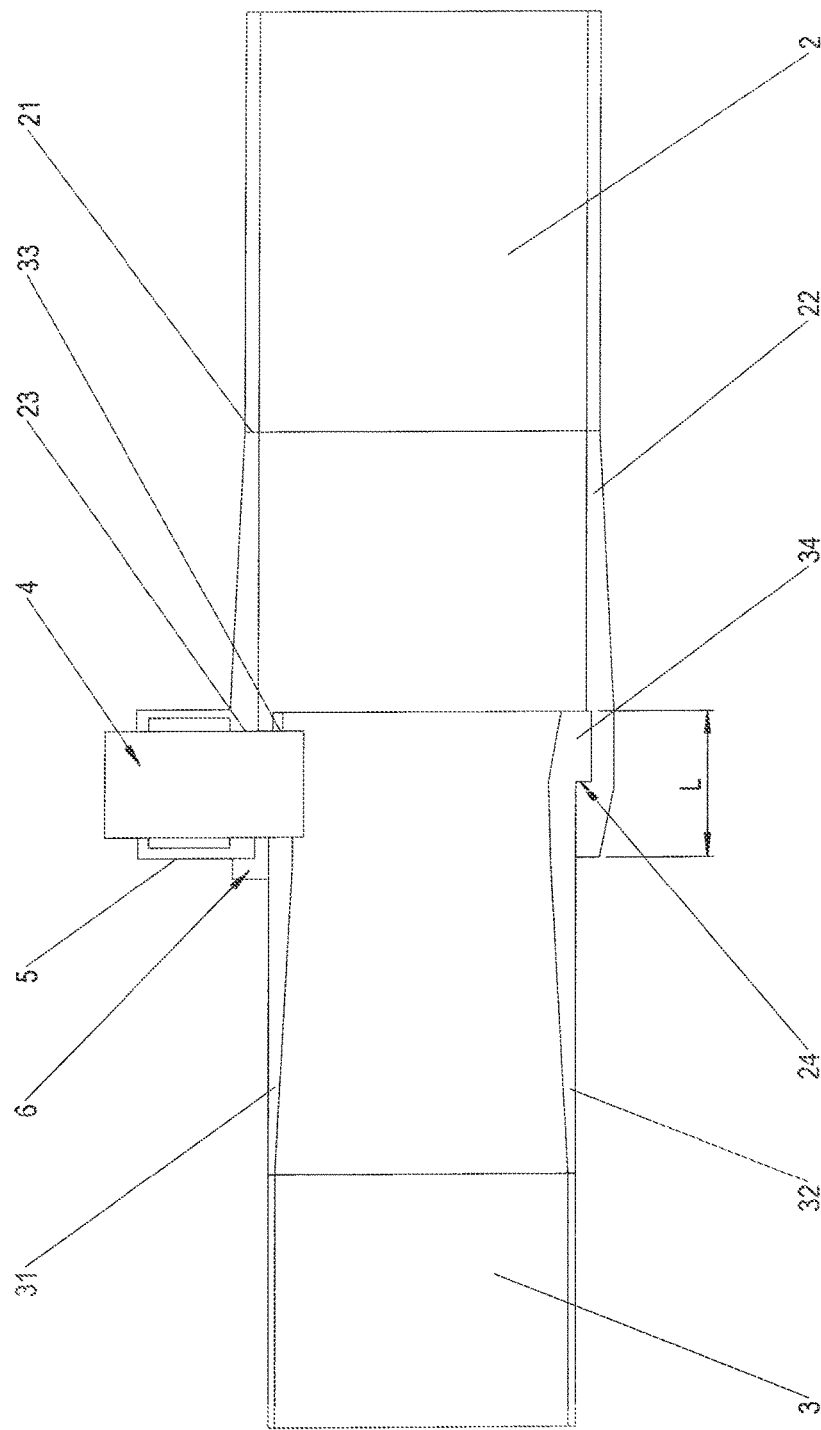
FIG. 2. shows a part view of the telescopic sliding beam in accordance with the invention.

FIG. 2 shows a detail view of the overlap region of the sliding beam box 2 and of the internal sliding beam 3 in accordance with an embodiment of the invention. It can be recognized in this respect that in the region of the two bottom chords 22, 32, the internal sliding beam 3 has a collar extending toward its outer side perpendicular to the telescoping direction as an abutment 34. The sliding beam box has an inwardly projecting collar as an abutment 24. It can additionally be recognized that the material thickness of the sliding beam box 2 increases in size at the end remote from the work machine. The same applies to the internal sliding beam 3 at its end facing the work machine. A bolt 4 can furthermore be recognized that is arranged in the two openings 23, 33 of the sliding beam box 2 and of the internal sliding beam 3 aligned flush with one another. An elevated portion 5 can furthermore be seen that extends perpendicular to the telescoping direction from the sliding beam box 2 in an aligned manner with the opening 23 in the peripheral region of the sliding beam box 2. This elevated portion 5 serves as a further abutment surface for the bolt 4 and prevents a slanting of the bolt 4 on a large force exertion.

Reference numeral 6 designates an insertion block that fills a gap between the inner side of the top chord 21 of the sliding bolt box 2 and the outer side of the top chord 31 of the internal sliding beam 3. The overlap region L of the sliding beam box 2 and the internal sliding beam 3 is likewise shown.

The insertion block is releasably attached in the gap. This means that on an insertion and removal procedure and on an assembly or dismantling of the telescopic sliding beam 1, the insertion block 6 is taken out of the gap.

Since the gap is larger in its extent perpendicular to the telescoping direction than the extent of the abutment 34 of the internal sliding beam 3 perpendicular to the telescoping direction, the internal sliding beam 3 can be completely pulled out of the sliding beam box 2 by a raising or by another procedure of the internal sliding beam 2 that brings the mechanical abutments 24, 34 out of engagement. An introduction into the sliding beam box 2 is naturally accordingly also possible in an analog manner. An assembly or a dismantling of the telescopic sliding beam 1 in accordance with the invention can thereby be carried out particularly easily and fast. No reduction in the stability has to be accepted in this respect in working operation since the insertion block 6 provides a force transmission. A particularly small overlap region L of the sliding beam box 2 and of the internal sliding beam 3 is rather possible due to the embodiment in accordance with the invention so that a large extension length of the sliding beam 1 is reached.

Figure 3:
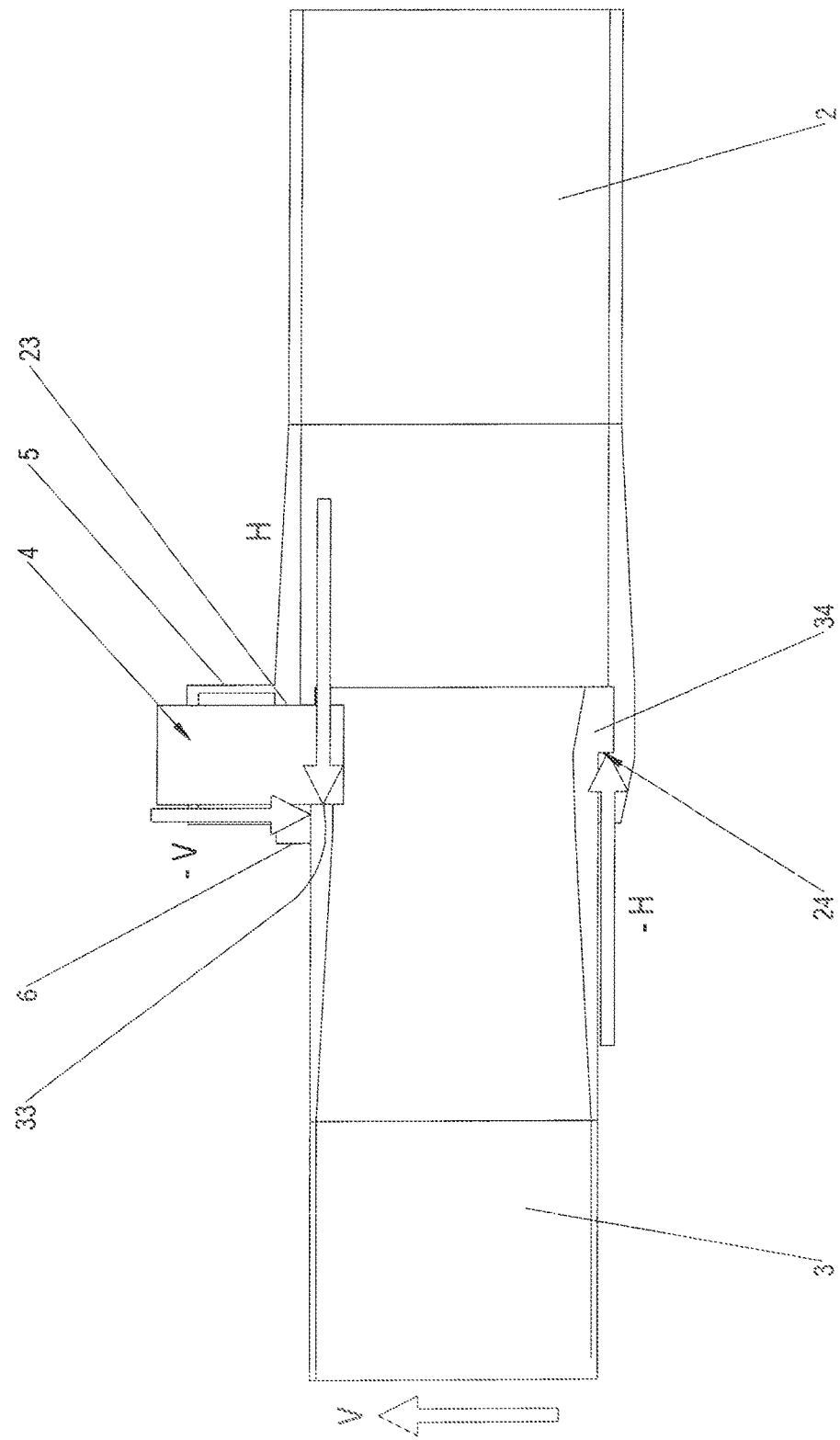
FIG. 3. shows a detail view of the telescopic sliding beam in accordance with the invention, with a representation of the forces that occur.

The detail view of FIG. 2 is supplemented in FIG. 3 by the forces acting in a supporting procedure. As previously described, an upwardly directed vertical force +V acts on the support foot and causes a bending moment and a counterforce −V (that is, a downwardly directed force) in the region of the overlap that is removed by the insertion block 6. The bending moment is removed by a horizontal force couple +H and −H. The force +H is removed by the bolt 4. The force −H is removed by the abutments 24 and 34.

The introduction of the bolt in the top chord can place by a hydraulic or mechanical force.

The invention claimed is:

1. A telescopic sliding beam for supporting a work machine, comprising:
    a sliding beam box; and
    an internal sliding beam that is outwardly telescopically supported in the sliding beam box, wherein
    the sliding beam box and the internal sliding beam each have an opening in a peripheral region, with the openings overlapping one another in an outwardly telescoped state of the telescopic sliding beam, and with a bolt introduceable into the overlapping openings;
    the sliding beam box has an abutment at only one inner side at the peripheral region; and
    the internal sliding beam has an abutment at an outer side, wherein the abutment is an outwardly projecting collar, with the abutment of the sliding beam box and the abutment of the internal sliding beam contacting one another in the outwardly telescoped state such that a further pulling of the internal sliding beam out of the sliding beam box is suppressed;
    wherein the opening of the sliding beam box and the opening of the internal sliding beam overlap one another when the abutment of the sliding beam box and the abutment of the internal sliding beam contact one another.

2. The telescopic sliding beam in accordance with claim 1, wherein the opening of the sliding beam box and the opening of the internal sliding beam are arranged in a respective top chord; and the abutment of the sliding beam box and the abutment of the internal sliding beam are arranged in a respective bottom chord.

3. The telescopic sliding beam in accordance with claim 1, wherein the abutment of the sliding beam box is formed in one piece with the sliding beam box and/or the abutment of the internal sliding beam is formed in one piece with the internal sliding beam.

4. The telescopic sliding beam in accordance with claim 1, wherein the opening of the sliding beam box and the opening of the internal sliding beam are of identical form.

5. The telescopic sliding beam in accordance with claim 1, wherein the opening of the sliding beam box and the opening of the internal sliding beam are arranged directly above one another in the outwardly telescoped state.

6. The telescopic sliding beam in accordance with claim 1, wherein, in a marginal region of its opening, the sliding beam box has an outwardly or inwardly projecting elevated portion that is perpendicular to a telescoping direction of the sliding beam and that is aligned with the opening in the peripheral region of the sliding beam box.

7. The telescopic sliding beam in accordance with claim 6, wherein the perpendicular elevated portion is formed in one piece with the sliding beam box.

8. The telescopic sliding beam in accordance with claim 1, wherein, in the outwardly telescoped state of the sliding beam, a gap is present between the inner side of the sliding beam box and the outer side of the internal sliding beam, with the gap being larger than or equal to a height of the abutment at the outer side of the internal sliding beam.

9. The telescopic sliding beam in accordance with claim 1, wherein, in an outwardly telescoped state of the siding beam, an insertion block is inserted into a gap between the inner side of the sliding beam box and the outer side of the internal sliding beam.

10. The telescopic sliding beam according to claim 4, wherein the opening of the sliding beam box and the opening of the internal sliding beam have a circular or rectangular shape.

11. The telescopic sliding beam according to claim 5, wherein the opening of the sliding beam box and the opening of the internal sliding beam are aligned flush with one another.

12. The telescopic sliding beam according to claim 7, wherein the perpendicular elevated portion surrounds the entire marginal region of the opening of the sliding beam box.

13. The telescopic sliding beam according to claim 8, wherein the gap is between a top chord of the sliding beam box and a top chord of the internal sliding beam.

14. The telescopic sliding beam in accordance with claim 9, wherein the gap is between a top chord of the sliding beam box and a top chord of the internal sliding beam.

15. A work machine having a telescopic sliding beam for supporting the work machine, comprising:
  a sliding beam box; and
  an internal sliding beam that is outwardly telescopically supported in the sliding beam box,
  wherein the sliding beam box and the internal sliding beam each have an opening in a peripheral region, with the openings overlapping one another in an outwardly telescoped state of the telescopic sliding beam, and with a bolt introduceable into the mutually overlapping openings;
  the sliding beam box has an abutment at only one inner side at the peripheral region;
  the internal sliding beam has an abutment at an outer side, wherein the abutment is an outwardly projecting collar, with the abutment of the sliding beam box and the abutment of the internal sliding beam contacting one another in an outwardly telescoped state such that a further pulling of the internal sliding beam out of the sliding beam box is suppressed;
  wherein the opening of the sliding beam box and the opening of the internal sliding beam overlap one another when the abutment of the sliding beam box and the abutment of the internal sliding beam contact one another.

16. The work machine according to claim 15, wherein the work machine is a mobile crane or an excavator.

* * * * *